United States Patent [19]
Lenson

[11] Patent Number: 5,346,664
[45] Date of Patent: Sep. 13, 1994

[54] APPARATUS AND METHOD FOR FORMING A RIBBON OF CONTINUOUSLY CONNECTED DISH-SHAPED SEQUINS

[76] Inventor: Harry Lenson, 1302 13th St., North Bergen, N.J. 07047

[21] Appl. No.: 881,466

[22] Filed: May 11, 1992

[51] Int. Cl.⁵ ............................................. B29D 19/04
[52] U.S. Cl. ................................... 264/154; 264/155; 264/157; 264/163; 264/DIG. 34; 425/301; 425/308; 425/801; 425/DIG. 37
[58] Field of Search ............... 264/DIG. 34, 138, 145, 264/148, 157, 160, 163, 165, 167, 210.1, 284, 285, 296, 154, 155; 425/301, 308, 383, 397, 398, 400, 801, 394, DIG. 37, 395; 428/65; 156/93

[56] References Cited

U.S. PATENT DOCUMENTS

| | | | |
|---|---|---|---|
| T102,302 | 10/1982 | Commisso | 264/154 |
| 239,357 | 3/1881 | Williamson | 425/801 |
| 343,709 | 6/1886 | Halstead | 425/801 |
| 2,973,555 | 3/1961 | Schwerke | 425/801 |
| 3,134,138 | 5/1964 | Pufahl | 264/167 |
| 3,414,937 | 12/1968 | Malmgren | 425/DIG. 37 |
| 3,475,521 | 10/1969 | Stroop | 264/163 |
| 3,475,526 | 10/1969 | Seto | 264/163 |
| 4,252,516 | 2/1981 | Raley et al. | 425/DIG. 37 |
| 4,276,336 | 6/1981 | Sabee | 264/154 |
| 4,341,727 | 7/1982 | Landsness et al. | 425/DIG. 37 |
| 4,402,660 | 9/1983 | Prusak | 264/163 |
| 4,477,243 | 10/1984 | Wallsten | 264/163 |
| 4,623,411 | 11/1986 | Dallak et al. | 156/93 |
| 4,807,546 | 1/1989 | Lenson et al. | 112/88 |
| 4,952,436 | 8/1990 | Ruschmann | 428/65 |
| 5,094,601 | 3/1992 | Sparrow et al. | 425/801 |
| 5,147,591 | 9/1992 | Yoshida | 264/163 |

FOREIGN PATENT DOCUMENTS

| | | |
|---|---|---|
| 3035958 | 5/1981 | Fed. Rep. of Germany . |
| 62-179492 | 8/1987 | Japan . |
| 2-13495 | 1/1990 | Japan . |
| 668281 | 12/1988 | Switzerland . |

*Primary Examiner*—Jay H. Woo
*Assistant Examiner*—Duane S. Smith
*Attorney, Agent, or Firm*—Jones, Day, Reavis & Pogue

[57] ABSTRACT

Apparatus for forming a continuous ribbon of connected dish-shaped sequins including a punch-and-die system for receiving a continuous ribbon of moldable material, a power source coupled to the continuous ribbon of moldable material to move the ribbon through the punch-and-die system incrementally to discrete spaced positions; and forming a score line at a first discrete position of the ribbon, punching a hole at a second discrete position of the ribbon, shaping the sequin at third and fourth discrete positions of the ribbon, forming the dish-shaped face at a fifth discrete position of the ribbon and accomplishing the formation of the score line, the hole, the outer shape of the sequin and the dish-shaped face on each sequin simultaneously by the punch-and-die system.

14 Claims, 2 Drawing Sheets

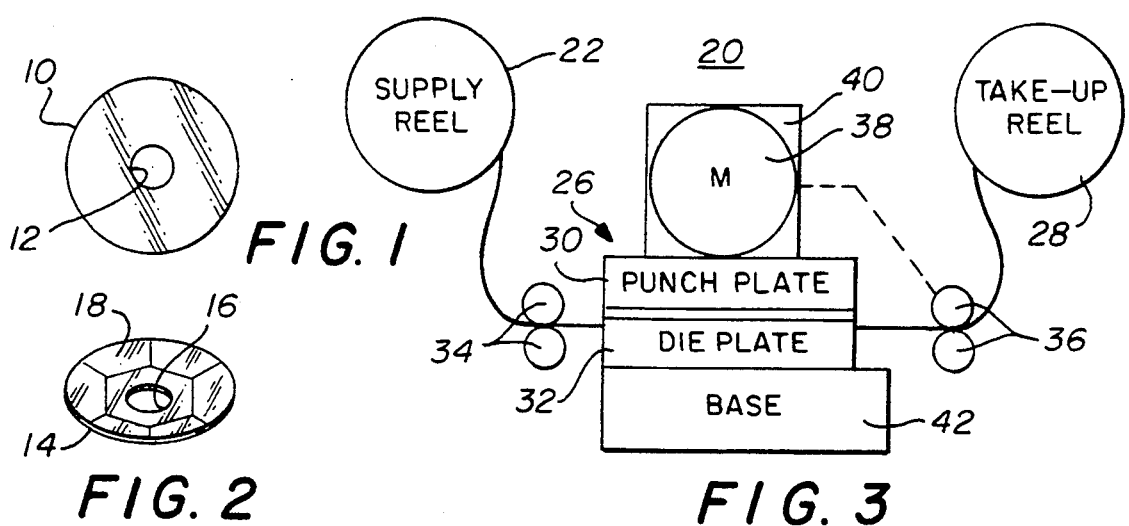
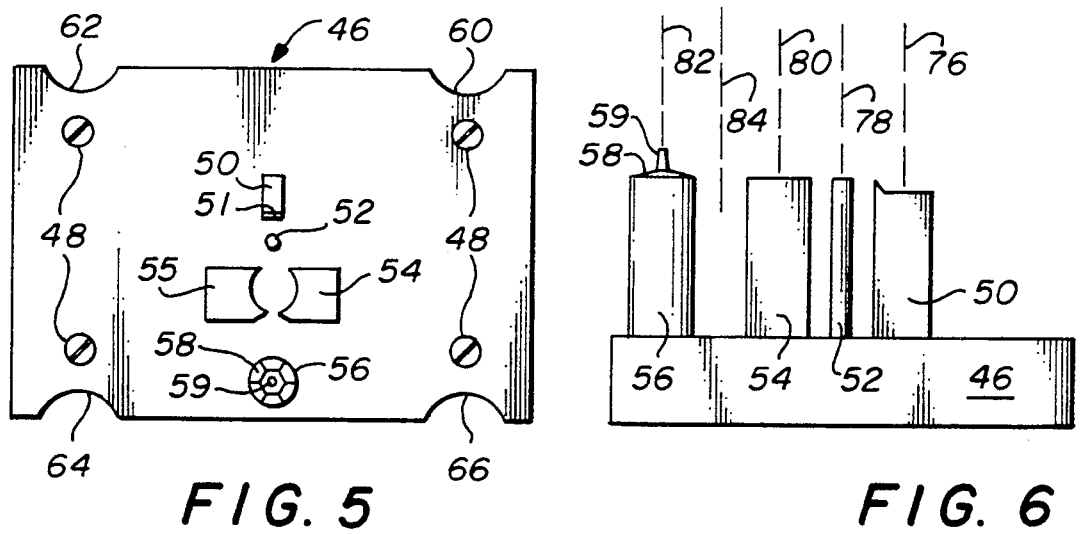
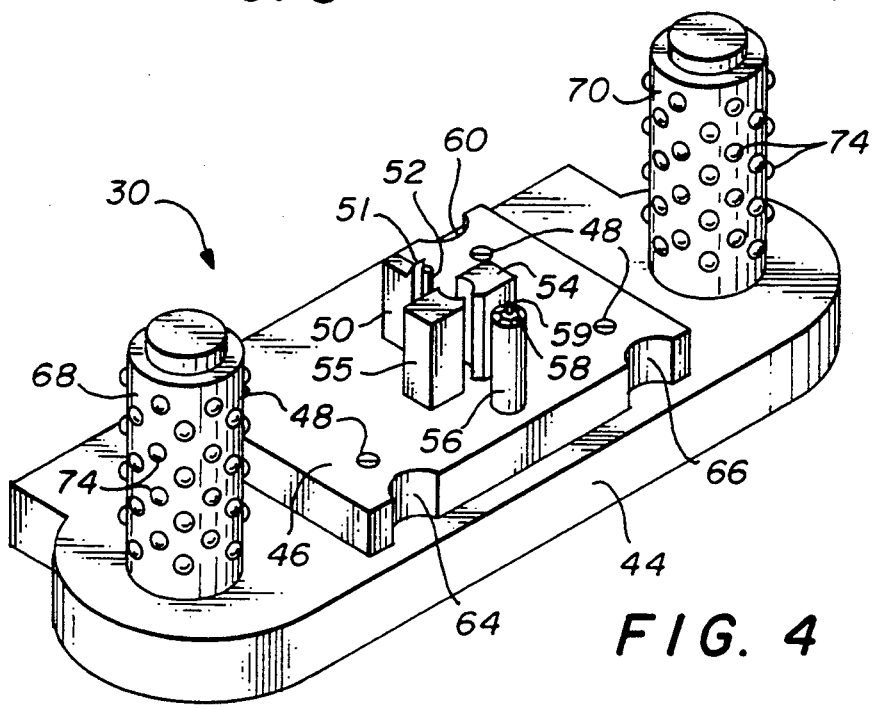

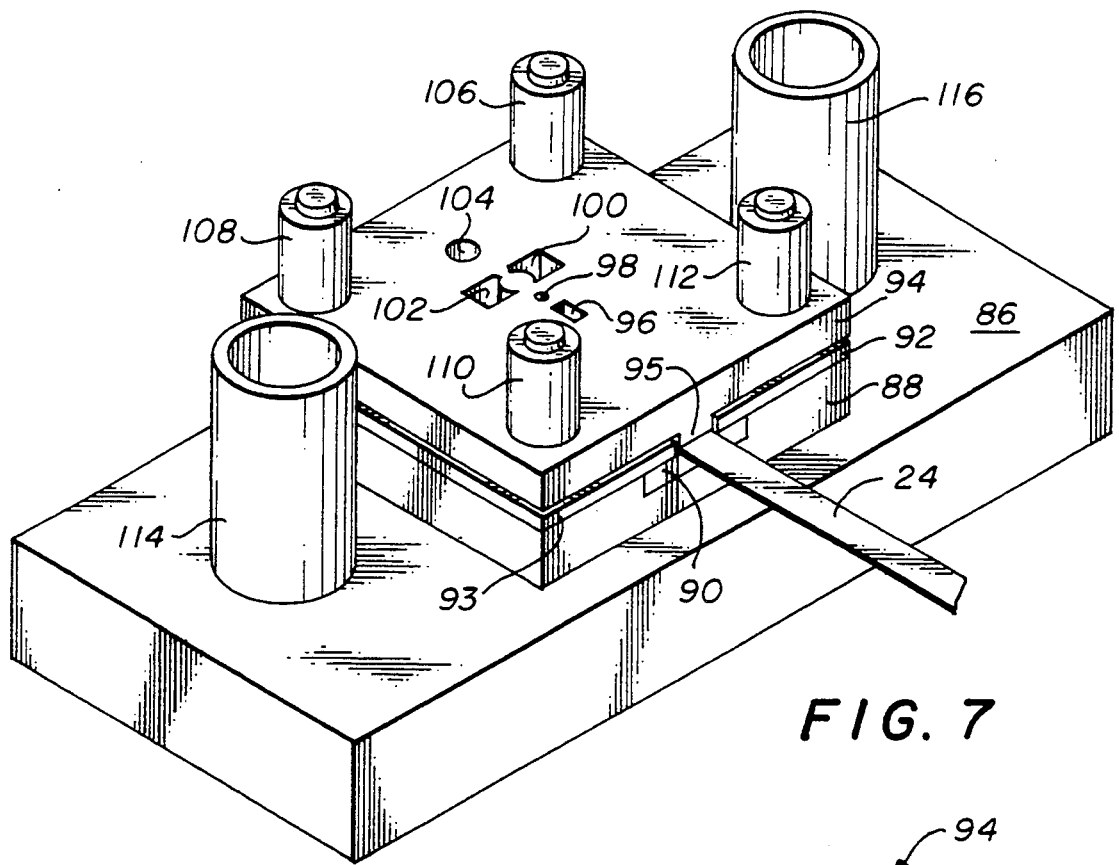
FIG. 7
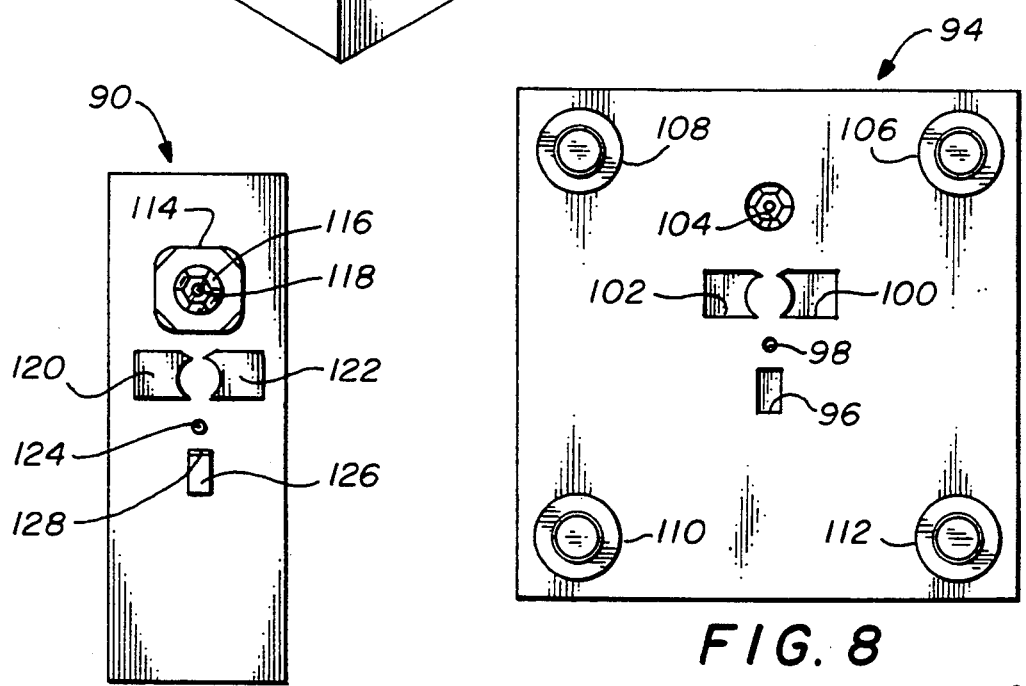
FIG. 9
FIG. 8
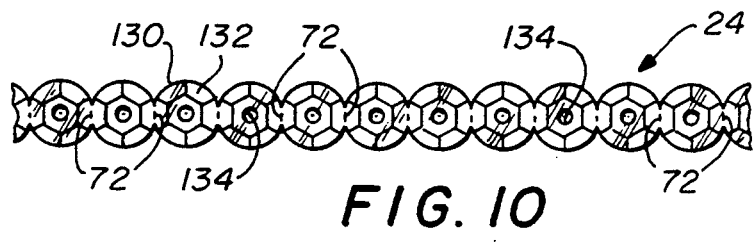
FIG. 10

APPARATUS AND METHOD FOR FORMING A RIBBON OF CONTINUOUSLY CONNECTED DISH-SHAPED SEQUINS

FIELD OF THE INVENTION

The present invention relates in general to a device for forming a continuously connected ribbon of sequins and in particular to apparatus and method for forming a ribbon of continuously connected dish-shaped sequins.

BACKGROUND OF THE INVENTION

Sequins are well known in the art and are usually flat, circular, shiny disks that can be applied to garments to increase the appeal and attractiveness thereof. Such flat sequins are made in a continuous strip as illustrated in FIG. 1 of U.S. Pat. No. 4,807,546. Each of the sequins has a substantially circular outer diameter with a slight degree of flattening at the noon and six o'clock positions due to the inherent process of severing the sequins from the continuous strip without discarding any material. An orifice is also present in the center of each sequin to allow for passage of needle and thread so that it can be attached to a garment or other material. In order to provide for easy and precise detachment of a single sequin from the continuous strip, at the neck portion adjoining adjacent sequins, a score line is produced perpendicular to the length of the strip. It has been found, as indicated in U.S. Pat. No. 4,807,546, that scoring of the strip results in a cleaner separation of the sequin from the continuous strip thereby ensuring that the portion of the strip at the narrowest point between sequins is not unduly weak and will not sever during feeding of the strip from a feed wheel to the sewing attachment. Such continuous rolls or reels of flat sequins can then be used in an automated process for attaching the sequins to garments or other material as set forth in U.S. Pat. No. 4,807,546.

However, dish-shaped sequins with multifaceted faces are more attractive on garments or other material because they provide multiple light reflecting faces and provide enhanced decoration. Such sequins have been handmade in the prior art with each individual sequin being placed in a die with a manual punch being used to form the sequin with the dish-shaped face having multiple facets thereon. Such sequins are obviously very expensive because of the arduous labor that must be performed to shape each sequin properly. Further, such sequins must be hand-sewn on garments or other material because no machine has been developed that can feed individual sequins to a sewing device. They must be continuously connected to each other in a ribbon form and in the prior art this has not been possible with dish-shaped sequins.

The present invention solves the problems of the prior art by providing an apparatus for forming a ribbon of continuously connected dish-shaped sequins. A continuous ribbon of moldable material, such as seven mil polyester in widths of approximately 0.312 inch or other desired widths, is fed to a punch-and-die system. The material must be of sufficient thickness and moldability that it will retain a dish shape after being formed in the punch-and-die system. The continuous ribbon of moldable material is moved through the punch-and-die system incrementally from one discrete position to the next. At a first position a score line is formed in a plane perpendicular to the movement of the ribbon of material which will later become a score line between individual sequins to facilitate their removal automatically when they are sewed on material. At a second position in the die, a hole is punched in the ribbon. At third and fourth positions, the outer shape of the sequin is formed such that the ribbon has continuous sequins coupled together by a narrow piece of ribbon on which the score line is located. At a fifth spaced location in the punch-and-die system, the dish-shaped sequin is formed with a multifaceted face. The completed ribbon of continuously connected dish-shaped sequins is then received from the output of the punch-and-die system on a take-up reel for use at a later time. The forming of the score line, the hole, the outer shape of the sequin and the multifaceted dish-shaped face is accomplished simultaneously by the punch-and-die system after the ribbon has moved from the first position to the fifth position.

The punch plate has thereon in sequential order the scoring punch, the round punch for forming the hole, the trim or sequin shaping punches and the dish-shape forming punch. Obviously, the die portion has the appropriate orifices therein for receiving the punches as designated. A motor is coupled to any well-known device such as stepping wheels to step the tape through the punch-and-die plates incrementally to the five discrete positions. Further, the motor drives a cam operated arrangement in a well-known manner which forces the punch plate into the die plate when the continuous ribbon has stopped at each particular discrete position.

Thus, it is an object of the present invention to provide a method and apparatus for forming a ribbon of continuously connected dish-shaped sequins.

It is a further object of the present invention to provide a punch-and-die system for receiving a continuous ribbon of moldable material, forming a score line between sequins, punching a hole in the ribbon of moldable material at the center of each sequin, cutting the outer shape of each sequin around the hole so as to leave a connecting portion with the score line between sequins and forming a dish-shape in each sequin with multiple faces to enhance the light reflecting capabilities of the sequin.

SUMMARY OF THE INVENTION

Thus, the invention relates to apparatus for forming a ribbon of continuously connected dish-shaped sequins comprising a continuous ribbon of moldable material, a punch-and-die system for receiving the continuous ribbon of moldable material, a power source coupled to the continuous ribbon to move the ribbon through the punch-and-die system incrementally to discrete positions, and the punch-and-die system being coupled to the power source for punching a hole in the continuous ribbon of moldable material at one of the discrete positions of the ribbon, cutting the outer shape of the sequins around the hole so as to leave a connecting portion between sequins at two consecutive discrete positions of the ribbon and forming a dish-shape in each sequin at yet another discrete position of the ribbon.

The invention also relates to a method of forming a ribbon of continuously connected dish-shaped sequins comprising the steps of feeding a continuous ribbon of moldable material into a punch-and-die system, moving the continuous ribbon through the punch-and-die system incrementally at discrete intervals and simultaneously, at each discrete interval, punching a hole, forming the outer shape of the sequin so as to leave a connecting portion between sequins and forming a dish-shape on each sequin in the continuous ribbon of material to form a continuous ribbon of dish-shaped sequins.

BRIEF DESCRIPTION OF THE DRAWINGS

These and other objects of the present invention will be more fully disclosed in conjunction with the following detailed description of the drawings in which like numerals represent like elements and in which:

FIG. 1 is a top view of a typical flat sequin;

FIG. 2 is a perspective view of a typical handmade dish-shaped sequin;

FIG. 3 is a diagrammatic representation of the novel apparatus of the present invention for receiving a continuous ribbon of moldable material and forming a ribbon of continuously connected dish-shaped sequins;

FIG. 4 is a perspective view of the punch portion of the punch-and-die set used to form the ribbon of continuously connected dish-shaped sequins;

FIG. 5 is a top view of the punch plate used in the punch-and-die set of FIG. 4;

FIG. 6 is an end view of the punch plate shown in FIG. 3;

FIG. 7 is a perspective view of the die portion of the apparatus for forming the ribbon of continuously connected dish-shaped sequins;

FIG. 8 is a plan view of the stripper portion of the die illustrated in FIG. 7;

FIG. 9 is a plan view of the die plate used in the die portion of the apparatus illustrated in FIG. 7; and FIG. 10 is an illustration of a portion of a ribbon of continuously connected dish-shaped sequins formed by the novel apparatus of the present invention.

DETAILED DESCRIPTION OF THE DRAWINGS

A circular flat sequin 10 is illustrated in FIG. 1 with an orifice 12 in the center thereof for enabling the sequin to be attached to a garment. These sequins are formed of lightweight plastic or metal. They may be made in a continuous ribbon as illustrated in FIG. 1 of U.S. Pat. No. 4,807,546 for automatically attaching the sequin to a garment or other material.

FIG. 2 is a perspective view of a dish-shaped sequin 14 that has an orifice 16 in the center thereof and a multiplicity of facets 18 formed thereon to enhance the light reflecting capability of the sequin 14. This sequin is formed by hand with a hand-operated punch-and-die system that forms one sequin 14 at a time. Clearly, the formation of individual sequins by hand is extremely time-consuming and expensive. Further, the individual sequins must be sewn onto garments or other material by hand since there is no existing machine capable of sewing isolated, individual sequins on such material or garments.

FIG. 3 is a diagrammatic representation of the novel apparatus of the present invention for forming a ribbon of continuously connected dish-shaped sequins. The novel apparatus 20 includes a supply reel 22 holding a continuous ribbon of moldable material 24. The material 24 may be, for instance, a seven mil thickness of polyester having a width of approximately 0.312 inch or any other suitable material for forming dish-shaped sequins. The requisite is that the material be moldable such that when the dish-shape is formed in the sequin, it retains that shape. The continuous ribbon of moldable material 24 is fed through the novel punch-and-die system 26 to a take-up reel 28. The material 24 passes between a punch plate 30 and a die plate 32 forming the system for molding the continuously connected dish-shaped sequins. Stepper wheels 34 and/or 36 may be connected to a motor 38 in any well-known manner to cause the moldable material 24 to move through the punch-and-die system 26 incrementally to discrete positions. Motor 38 also drives the cam 40 in a well-known manner which causes the punch plate to move towards the die plate and form the dish-shaped sequins as the ribbon steps through the punch-and-die system 26. A base 42 supports the entire system 20. Thus the take-up reel 28 contains a ribbon 29 of continuously connected dish-shaped sequins, a portion of which is shown in FIG. 10 hereof.

FIG. 4 is an isometric view of the punch portion of the punch-and-die system 26. Thus the punch portion 30 of the punch-and-die system 26 includes a base plate 44 to which is attached the punch plate 46. Punch plate 46 is secured to the base plate 44 in any well-known manner such as, for example, by screws 48. The punch plate 46 includes thereon in sequential order a score forming punch 50 having a raised edge 51 for forming the score line. The raised edge can be seen more clearly in FIG. 6. Next is the punch rod 52 for forming the orifice for the center of each sequin. Following in sequence are the punch portions 54 and 55 for cutting the outer shape of the sequins around the hole formed by the punch 52 so as to leave a connecting portion between sequins. The connecting portion between sequins is designated by the numeral 72 in FIG. 10 that shows a portion of the continuous ribbon of continuously connected dish-shaped sequins. Following the punch sections 54 and 55 for cutting the outer shape of the sequins is the punch 56 having a multifaceted face 58 thereon and point 59 for entering the hole 134 (FIG. 10) in each orifice. It is used to form the dish-shape in each sequin with the multiple faces to enhance the light reflecting capabilities of the sequin. Arcuate portions 60, 62, 64 and 66 near the corner of the punch plate 46 are used to mate with corresponding circular projections on the die set. Likewise, the guideposts 68 and 70 are received by cylindrical attachments on the die set to allow smooth movement of the punch set as it moves toward the die set. The guideposts 68 and 70 may have a plurality of ball bearings 74 therein for easy movement of the punch set with respect to the die set.

FIG. 5 is a top view of the punch plate illustrated in FIG. 4. Again the order of the punch elements can be seen. Thus there is first the score punch 50 having a raised edge 51 thereon for forming the score line. It is followed by the elongated circular punch 52 for forming the orifice 134 (FIG. 10) that is to be in the center of each sequin. Circular punch 52 is then followed by the punch units 54 and 55 which cut the outer shape of the sequins around the hole 134 so as to leave the connecting portion 72 (FIG. 10) between sequins. Finally, at the last discrete position, the circular punch 56 with the face 58 for forming the dish-shape with multiple faces is illustrated. The rounded projection 59 is inserted in the orifice of each sequin to allow the punch 56 to make a full impression on the ribbon of material 24.

The right end view of the punch plate in FIG. 5 is illustrated in FIG. 6. The punch unit 50 having the raised edge 51 for forming the score line can be clearly seen. The center of this punch 50 is located at a first discrete position in the punch-and-die system as the continuous ribbon of moldable material moves through the punch-and-die system. This first position is represented by the dashed line 76. The punch plate 46 moves into the die plate 32 thus forming the score line on the continuous ribbon of material 24. The continuous ribbon is then advanced to the second discrete position indicated by the dashed line 78. Again the punch plate 46 is forced into the die plate 90 and round elongated rod 52 punches a hole 134 (FIG. 10) in the ribbon of material 24 and punch 50 again uses the raised portion 51 to form a second score line in the continuous ribbon 24. The ribbon 24 is then moved to the third discrete position 80 where the punch set 54 and 55 cuts a portion of the outer shape of the sequin around the hole 134 that was punched previously. Simultaneously, the round elongated punch rod 52 forms another orifice 134 in the continuous ribbon 24 and the punch 50 with the raised portion 51 forms another score line. The continuous ribbon 24 then moves to the fourth discrete step indicated at 82 at which the punch plates 54 and 55 form the remainder of the first sequin leaving the thin coupling section 72 (FIG. 10) while cutting a portion of the outer shape of the next sequin around the next hole. Simultaneously, punch 52 is forming the next orifice 134 and the punch 50 with its raised portion 51 is forming the next score line. The tape then is moved incrementally to the fifth discrete position 84 where the rounded punch 56 is forced into the die portion causing face 58 with its multiple facets thereon to form the dish-shape in each sequin while the projection 59 is aligned in the orifice 134 of that particular sequin. From that point on, as the continuous ribbon of moldable material 24 is moved through the punch-and-die system incrementally through the five discrete positions 76, 78, 80, 82 and 84, the score line, the orifice, the outer shape of the sequin and the dish-shaped face are all accomplished simultaneously by the punch-and-die system 26.

The die portion 32 of the punch-and-die system 26 is illustrated in a perspective view in FIG. 7. It has a base plate 86 on which is mounted in any well-known fashion a chase plate 88, die plate 90, stock guide plates 92 and stripper plate 94. A space is formed between projection 95 on stripper plate 94 and the die plate 90 in which the continuous ribbon of moldable material 24 can be inserted. It is guided by stock guides 92 and 93 through the die under the stripper plate 94. Orifices 96, 98, 100, 102 and 104 are formed in the stripper plate 94 and extend into the die plate 90 and chase plate 88 such that when the punch elements 50, 52, 54, 55 and 56, shown in FIG. 6, are forced into their corresponding orifices 96, 98, 100, 102 and 104 that the dish-shaped sequins are formed as indicated previously. A space exists between the stripper plate 94, stock guides 92 and 93 and the die plate 90. The space is formed by springs, not shown, which are compressible and allow the stripper plate 94 to be pressed downward with the punch section 30 to absorb shock while forming the continuous ribbon 29 of dish-shaped sequins. The springs are formed in any well-known manner that such punch-and-die sets are constructed in the prior art and, therefore, are not shown or discussed in detail. Guide pins 106, 108, 110 and 112 fit in the corresponding arcuate sections 60, 62, 64 and 66 in the punch plate illustrated in FIGS. 4 and 5. Further, the cylindrical projections 114 and 116 receive the guideposts 68 and 70, respectively, shown in FIG. 4. Thus the punch-and-die system 26 has a punch set 30 carefully mated with the die set 32 so that accurate contact with the continuous ribbon of moldable material 24 is made at each discrete interval of movement through the punch-and-die system.

FIG. 8 is a top view of the stripper plate 94. The spaced alignment of the various orifices 96, 98, 100, 102 and 104 is illustrated.

FIG. 9 is a top view of the die plate 90. It has the mating die section 116 for receiving the punch 56 for forming the dish-shaped sequin with the multiple faces 116. Orifice 118 is in the center thereof to receive the projection 59 in the center of the punch 56 as shown in FIG. 6. As indicated earlier, the punch portions 54 and 55 extend downwardly through the stripper plate to the die plate orifices 120 and 122 for cutting the outer shape of the sequins around the orifice 134 formed by the punch 52. Orifice 124 receives the tip of the punch 52 for forming the orifice 134 in the sequins. Finally, orifice 126 has an inset with a raised edge 128 to mate with the raised edge 51 on the punch portion 50 to form the score lines.

The resulting product is a continuous ribbon 29 of connected dish-shaped sequins a portion of which is shown in FIG. 10 where the individual sequins 130 contain multiple faces 132 and an orifice 134 therein with the score line 72 separating the sequins in the narrow portion that connects them.

Thus, the process performed by the novel apparatus of FIG. 3 comprises the steps of feeding a continuous ribbon of moldable material 24 into a punch-and-die system 26, moving the continuous ribbon 24 through the punch-and-die set 26 incrementally at discrete intervals by stepping rollers 34 or 36 and simultaneously, at the five discrete intervals, forming a score line 72 in the area connecting the continuous string 29 of sequins 130, punching a hole 134 in each sequin, forming the sequin outer shape and forming the dish-shaped faceted faces 132 therein to form a unique ribbon 29 of continuously connected dish-shaped sequins as illustrated in part in FIG. 10. Thus, the product formed by the process, the ribbon 29, is a unique product that has not existed prior to this inventive process.

Thus, there has been disclosed a novel apparatus and process for forming a ribbon of continuously connected dish-shaped sequins. The sequins have multiple faces thereon for enhancing their light reflecting capability and are connected by score lines in the narrow area between adjacent sequins so that each sequin can be easily removed from the continuous ribbon when needed. The novel punch-and-die system simultaneously accomplishes at discrete positions the steps of forming the score line between sequins, punching the center orifice in each sequin, forming the outer shape of the sequins around the hole and forming the dish-shape in each sequin with the multiple faces. The continuous ribbon of connected dish-shaped sequins are formed on a take-up reel which can be used in later equipment to automatically sew the sequins on the material or garments. The product formed by the novel process is unique and is the first of its kind.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A method of forming continuously connected dish-shaped sequins comprising the steps of:

feeding a continuous ribbon of moldable material into a punch-and-die system;

forming the punch-and-die system of a punch portion and a die portion movable with respect to each other, said punch portion including a hole punch, a cutting element, and a dish-shape forming punch;

moving the continuous ribbon through the punch-and-die system incrementally to fixed positions at discrete, spaced intervals; and moving said punch portion with respect to said die portion as said ribbon moves through the system such that simultaneously, at the fixed positions, a hole is punched, the outer shape of the sequin is formed with the cutting element so as to leave a connecting portion between sequins, and a dish shape is formed on each sequin in the continuous ribbon of material with the dish-shaped forming punch to form a continuous ribbon of connected dish-shaped sequins.

2. A method as in claim 1 further including the step of receiving the continuous ribbon of connected dish-shaped sequins on a take-up spool.

3. A method as in claim 2 further including the steps of:

forming a score-line creating element as part of the punch portion of the punch-and-die system; and simultaneously forming a score line on the connecting portion between sequins when the punch portion is moved relative to the die portion to facilitate removal of each sequin from the continuous ribbon of continuously connected dish-shaped sequins.

4. A method as in claim 3 further including the step of using a punch with a face thereon to form facets in the dish-shaped sequins to facilitate light reflection.

5. A method as in claim 3 wherein the simultaneous steps further include the steps of:

forming the score line at a first fixed position in the punch-and-die system;

punching the hole at a second fixed spaced position in the punch-and-die system;

forming the sequin outer shape at third and fourth fixed, spaced positions in the punch-and-die system; and forming the dish-shaped faceted faces on each sequin at a fifth fixed, spaced position in said punch-and-die system.

6. A product formed by the process of claim 3.

7. A method of forming a ribbon of continuously connected dish-shaped sequins comprising the steps of:

feeding a continuous ribbon of moldable sequin material into a punch-and-die system;

forming the punch-and-die system of a punch portion and a die portion movable towards and away from each other;

moving the continuous ribbon through the punch-and-die system incrementally to at least first and second fixed positions at discrete, spaced intervals;

forming a first cutting element as a part of the punch portion for cutting the shape of the sequins and a second punch element for forming a dish shape with its corresponding die; and moving the punch portion in relation to its associated die in a repetitive fashion as the ribbon of sequin material moves through the punch-and-die system to form the outer shape of each sequin and to simultaneously form a dish shape on each shaped sequin thereby forming a ribbon of continuously connected sequins with each sequin having a dish shape.

8. Apparatus for forming a continuous ribbon of connected dish-shaped sequins comprising:

a continuous supply ribbon of moldable material;

a punch-and-die system for receiving the continuous ribbon of moldable material;

a punch portion of the system being movable with respect to a die portion of the system;

a power source coupled to the continuous ribbon to move the ribbon through the punch-and-die system incrementally to fixed positions at discrete, spaced intervals;

a punch forming part of the punch-and-die system for punching a hole in the continuous ribbon of moldable material at one of the fixed positions of the ribbon;

a cutting element forming part of the punch-and-die system for cutting the outer shape of the sequins around the hole at another one of the fixed positions of the ribbon so as to leave a connecting portion between sequins;

a dish-shape creating element forming part of the punch-and-die system for forming a dish shape in each sequin at yet another one of the fixed positions of the ribbon; and driving means coupling the power source to the punch-and-die system to cause one of the punch-and-die portions to move with respect to the other to cause simultaneously said punching, said cutting, and said forming of said dish-shaped sequin as said ribbon is moved incrementally through the punch-and-die system.

9. Apparatus as in claim 8, further including:

a supply spool for supplying the continuous ribbon of moldable material to the punch-and-die system; and a take-up spool coupled to the power source for rotatably receiving the ribbon of continuously connected dish-shaped sequins.

10. Apparatus as in claim 9 further including a punch forming part of the punch-and-die system for forming a score line between sequins to facilitate removing an individual sequin from the ribbon of continuously connected sequins.

11. Apparatus as in claim 10 wherein the dish-shape creating element further includes a punch for forming the dish-shaped sequins, the punch having a face thereon for forming facets in the dish-shaped sequins to facilitate light reflection.

12. Apparatus as in claim 10 wherein:

the score line is formed at a first one of the fixed positions of the ribbon;

the hole is punched at a second one of the fixed positions of the ribbon;

the sequin is shaped at third and fourth fixed positions of the ribbon;

the dish-shaped face is formed at a fifth one of the fixed positions of the ribbon; and the score line, the hole, the sequin outer shape and the dish-shaped face being formed simultaneously by the punch-and-die system.

13. Apparatus as in claim 8, wherein the punch-and-die system comprises:

a first punch-and-die combination for forming the score line in the continuous supply ribbon at a first one of the fixed positions;

a second punch-and-die combination for punching the hole in the continuous supply ribbon at a second one of the fixed positions;

a third punch-and-die combination for forming the outer shape of the sequin at third and fourth ones of the fixed positions;

the four punch-and-die combinations being linearly spaced in substantially aligned relationship to each other and operable simultaneously.

14. Apparatus for forming a continuous ribbon of connected dish-shaped sequins comprising:

a continuous supply ribbon of moldable sequin material;

a punch-and-die system for receiving the continuous ribbon of moldable sequin material, the punch-and-die system being formed of a punch portion and a die portion movable with respect to each other;

a power source coupled to the continuous ribbon to move the ribbon through the punch-and-die system incrementally to at least first and second discrete positions;

a first punch forming part of the punch portion of the punch-and-die system to shape the outer periphery of each sequin at the first discrete position;

a second punch forming part of the punch portion of the punch-and-die system and spaced from the first punch for engaging its associated die at the at least second discrete position to form a dish shape on each shaped sequin; and drive means coupling the power source to the punch-and-die system to move the punch portion with respect to the die portion as said ribbon is moved incrementally through the system to form a ribbon of continuously connected sequins with each sequin having a dish shape.

* * * * *